United States Patent
Whistler

(10) Patent No.: US 7,526,322 B2
(45) Date of Patent: Apr. 28, 2009

(54) REAL-TIME ANALYST PROGRAM FOR PROCESSING LOG FILES FROM NETWORK ELEMENTS

(75) Inventor: Kenneth Park Whistler, Bridgewater, NJ (US)

(73) Assignee: Cellco Partnership, Bedminster, NJ (US)

( * ) Notice: Subject to any disclaimer, the term of this patent is extended or adjusted under 35 U.S.C. 154(b) by 433 days.

(21) Appl. No.: 10/920,413

(22) Filed: Aug. 18, 2004

(65) Prior Publication Data

US 2006/0040711 A1 Feb. 23, 2006

(51) Int. Cl.
*H04M 1/00* (2006.01)

(52) U.S. Cl. .......................... 455/566; 455/466; 455/9; 455/423; 455/412.1

(58) Field of Classification Search .................. 455/566, 455/466, 9, 423, 412.1
See application file for complete search history.

(56) References Cited

U.S. PATENT DOCUMENTS

| | | | |
|---|---|---|---|
| 6,381,306 B1 | 4/2002 | Lawson et al. | |
| 6,385,301 B1 | 5/2002 | Nolting et al. | |
| 6,411,681 B1 | 6/2002 | Nolting et al. | |
| 6,681,232 B1 | 1/2004 | Sistanizadeh et al. | |
| 6,684,206 B2 | 1/2004 | Chen et al. | |
| 6,801,756 B1* | 10/2004 | Agrawal et al. | 455/67.11 |
| 6,970,183 B1* | 11/2005 | Monroe | 348/143 |
| 7,027,416 B1* | 4/2006 | Kriz | 370/328 |
| 7,181,619 B2* | 2/2007 | Motoyama et al. | 713/168 |
| 7,209,859 B2* | 4/2007 | Zeif | 702/182 |
| 7,225,249 B1* | 5/2007 | Barry et al. | 709/227 |
| 2002/0072358 A1* | 6/2002 | Schneider et al. | 455/423 |
| 2003/0225549 A1 | 12/2003 | Shay et al. | |
| 2005/0138426 A1* | 6/2005 | Styslinger | 713/201 |

* cited by examiner

*Primary Examiner*—Nghi H Ly
(74) *Attorney, Agent, or Firm*—McDermott Will & Emery LLP

(57) ABSTRACT

In a cellular telephone network or other communication network, there is a need to monitor the status and health of various nodes of the network in real-time. The techniques disclosed herein use a real-time link to the network node to obtain a data stream of messages for processing. In one example, a modified Telnet Terminal Program connects to a system element, the user logs in to the system element, and the Program causes the messages from the element's local log file to stream past the Telnet screen as they are produced. The streaming log messages also are parsed and entered into a database as they are produced, providing a real-time capture of the streaming data into a database form. Graphs, for example, can be set to update themselves and thereby display real-time information. The user can interact with a graph to select a graph point and see the system element message(s) that generated the graph point.

16 Claims, 14 Drawing Sheets

Real-Time Analyst
Message Storage

Real-Time Analyst
Automatic Query Interface With
Watch List Manager

Real-Time Analyst
Interactive Query Interface

Real-Time Analyst Interactive Graphical Interface

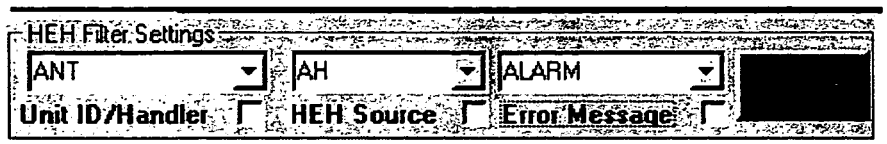

Fig. 11B

```
HEH Message                                          _ | □ | x |
File
Rank Report of 59 Cells WHERE SysName ="BRANCHBURG DCS"
AND TimeStamp BETWEEN #2/13/2004 6:00:00 AM#
AND #2/13/2004 9:59:59 PM#
602 Total Messages.
RANK    Count   Percent   Level    Cells   System
   1.     110    18.27     INFO     105    BRANCHBURG DCS
   2.      64    10.63    MINOR      20    BRANCHBURG DCS
   3.      33     5.48    MAJOR      12    BRANCHBURG DCS
   4.      32     5.32    MAJOR      52    BRANCHBURG DCS
   5.      32     5.32    MAJOR     161    BRANCHBURG DCS
   6.      32     5.32    MAJOR      28    BRANCHBURG DCS
   7.      25     4.15     INFO      40    BRANCHBURG DCS
   8.      20     3.32     INFO     274    BRANCHBURG DCS
   9.      20     3.32     INFO     160    BRANCHBURG DCS
  10.      19     3.16    MINOR     274    BRANCHBURG DCS
  11.      18     2.99     INFO      31    BRANCHBURG DCS
  12.      17     2.82    MINOR     161    BRANCHBURG DCS
  13.      16     2.66    MAJOR      40    BRANCHBURG DCS
  14.      15     2.49    MINOR     112    BRANCHBURG DCS
  15.      10     1.66    MINOR      62    BRANCHBURG DCS
  16.       9     1.50     INFO     173    BRANCHBURG DCS
  17.       9     1.50     INFO     106    BRANCHBURG DCS
  18.       8     1.33    MAJOR       5    BRANCHBURG DCS
```

Fig. 11C

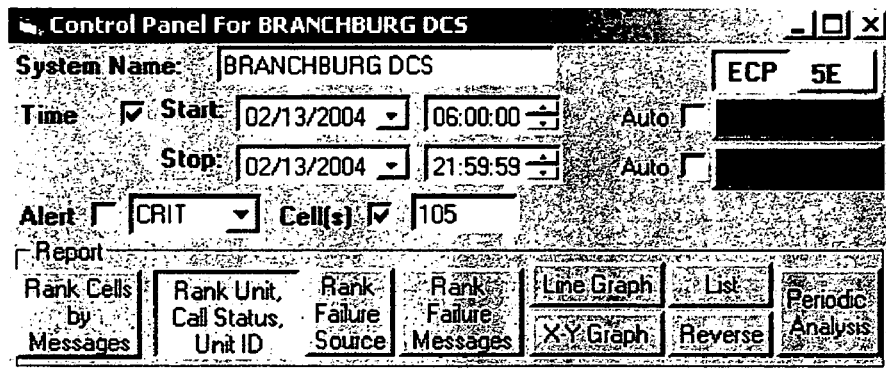

Fig. 11D

Fig. 11K
```
HEH Message                                                    _|□|×|
File
Rank Report of 2 Errors WHERE SysName ="BRANCHBURG DCS"
AND TimeStamp BETWEEN #2/13/2004 6:00:00 AM#
AND #2/13/2004 9:59:59 PM#
AND Cell = 105
AND UnitID LIKE "*CDM*"
AND Source LIKE "*FLEXENT*"
110 Total Messages.
RANK   Count   Percent   Level   Errors              System
  1.     55     50.00    INFO    SET:DS1-1 ALARM     BRANCHE
  2.     55     50.00    INFO    CLEARED:DS1-1 ALARM BRANCHE
```

Standard Telnet Terminal Session

REAL-TIME ANALYST PROGRAM FOR PROCESSING LOG FILES FROM NETWORK ELEMENTS

TECHNICAL FIELD

The present subject matter relates to techniques and equipment to obtain health related information, such as status and alarm messages, in real-time from event log files produced by elements of a communication network and to process those messages to provide information, for example, for use in predicting and responding to potential problems in network operations.

BACKGROUND

In recent years, telecommunication has become an increasingly important part of government and business operations as well as the everyday lives of individual citizens. Telephone networks now offer virtually everyone the ability to talk to each other almost anywhere in the developed world, and the development of public wireless telephone networks (e.g. cellular and PCS networks) have enhanced this communication ability by adding the convenience of almost limitless mobility. The Internet and packet-based data communications now enable rapid communication of a vast array of data, such as e-mail, web-pages and multi-media content; and recently, the wireless networks have extended their capabilities to offer wireless mobility for similar data communication applications.

As the demand for all of these telecommunication services expands, the carriers and other service providers deploy ever larger and more complex networks. To offer a viable service, any such network must be highly reliable and remain available to support service demands virtually all of the time, without substantial failure. Such network operations create a need for technologies to monitor and maintain the elements or nodes that form the fabric of the network infrastructure. To be cost effective, any such technique must be highly automated. A number of operations support technologies exist to meet the network operation demands.

As one example, U.S. Pat. No. 6,385,301 to Nolting et al. relates to systems and software for processing call detail records (CDRs) derived from parsing either SS7 signaling messages or AMA billing records from elements of a telephone network, and storing the CDRs in databases. A multi-dimensional database program provides an on-line analytical processing (OLAP) type system, for the user interface and report functions. The OLAP, for example, offers a database query interface with various report capabilities. Reports show the amount of call traffic matching a query and the time of occurrence of certain call events or messages.

Previous methods, similar to that disclosed in the Nolting et al. patent, involve downloading an entire daily log file from a network element and interpreting it offline. Since the files contain 24 hours of messages, for example that go from midnight the previous day, the messages in the file are not current. Even a current file contains messages produced up to the time of download and is not refreshed once it has been downloaded. In addition to issues of currency of the messages, continuous downloading of entire log files creates a burden on the network that increases as the file grows bigger throughout the day.

As another example, U.S. Pat. No. 6,681,232 to Sistanizadeh et al discloses software for real-time monitoring of network health, in a multi-switch optical Ethernet type packet data network. A service level manager program utilizes agents throughout the network to collect the necessary data regarding network operations. Examples of such agents include: SNMP A gents, RMON Agents, System Agents, Special Agents such as latency measurement agents, Enterprise Agents, Application Agents and Network Agents. The Agents are software managers running in specific network elements, for monitoring and reporting on the utilization and health of the respective network elements. The service level manager program analyzes data collected by the various software Agents, and from this data, the service level manager software creates reports/benchmarks on the health of the network and services.

In a somewhat similar fashion, wireless service providers and other network operators today use the Concord E-Health system to monitor network elements. That commercial system is based on retrieving Simple Network Management Protocol (SNMP—an industry-standard) messages from the network elements and translating their contents into diagnostic information. These messages are already in a database-ready form and often only indicate state information. The SNMP messages are obtained by polling of the network element by a central device or as a result of an alarming condition (known as a 'trap' in SNMP parlance). Although the polling may be more frequent than a 24-hour download operation, there may still be delays before the polling and capture of the status messages from the network elements.

Another approach commonly used by network operators involves a Telnet terminal communication with a particular network element. Telnet is a terminal-remote host protocol, which allows a person using a personal computer or other terminal device to connect to another computer device and operate as if the terminal were locally hardwire connected to the other computer device, typically for management and operations related functions. In an Internet application, the Telnet protocol allows operations personnel to remotely access a web server or the like. Many telecom equipment vendors include a Telnet capability for remote management access to their equipment, including their switches and routers and the like. Many carriers utilize this capability to allow network operations personnel to remotely connect to an rs232 serial port, or use a network connection and IP address, and log-in to network elements. A network element, such as a base station or switch of a cellular telephone network and/or data nodes of enhanced wireless networks generate messages containing health information, for example regarding status, traffic and alarm conditions. Unless the alarm reaches a level sufficient to trigger an automatic report, the element stores these messages in a log file. When operations personnel log-in via a Telnet connection, the terminal polls the element, and the element downloads the log file containing the latest batch of messages via the Telnet connection to the user's terminal. Once downloaded, the user can review the individual messages, and the messages are available for further processing.

FIG. 12 illustrates such a Telnet procedure in which an operations support system 10 downloads a log file under investigation from a monitored system element 20, such as a base station or switching node of a telecommunication network. The monitored system 20 maintains the log file shown at 21. The communication function 11 of the operations support system 10 initiates the Telnet communication protocol session 23 (over the appropriate connection medium). The user logs in and instructs the monitored system element 20 to download the file 11. In response, the system message stream functionality 25 transfers the log file 21 to the operations support system 10, for example, using a file transfer protocol (FTP) download. The messages from the downloaded file 11 are made available to the user, through a display function 13.

The connection 15 to the display function may be local, e.g. to a display on the user's PC or other terminal device serving as the system 10; or the connection 15 may allow remote access through another network connection or the like.

As in the other techniques outlined above, however, the Telnet polling and downloading approach does not provide real-time review of the messages, and the ability to process the messages has been rather limited.

SUMMARY

Hence a need exists for a technique to provide real-time review and processing of various operational health messages produced by a health or status logging function of an infrastructure element of a telecommunications network. In a cellular telephone network or other communication network, the techniques disclosed herein use a real-time link to the network node to obtain streaming messages for processing.

Hence, a method of real-time monitoring of operational status of an element of a communications network entails reception of alarm or other operational status messages produced by the network element, via a streaming communication session. The messages are received in real-time, as the element might otherwise generate the messages for its local log file. The method also involves parsing each of the received messages to extract relevant data about the operations of the network element. Fields of records in a database are populated with the extracted operational data. The monitoring method also provides a real-time display, based on the received messages.

The real-time display, for example, may be a real-time display of the messages as they are received. In addition, or as an alternative to the message display, the monitoring routine may process at least some records from the database and provide a real-time display of the processing results, for example, in the form of a graph or a report. The processed display typically updates in real-time, as new messages are received and parsed to update the database. If displayed in the form of a graph, the user can input a selection of a point on the displayed graph; and the record or records from the database regarding the message or messages that produced the selected point are displayed to the user.

Although applicable to other networks and network elements, the examples discussed in detail focus on monitoring elements of a mobile wireless communication network. Examples of elements of such a network that may be monitored include: a mobile switching center (MSC), a base station (BS), a base station controller (BSC) and a home location register (HLR).

Aspects of these concepts may be implemented in hardware, coupled for communication with operational network elements that require monitoring. Although special-purpose hardware may be developed, the examples utilize general-purpose hardware programmed to implement the monitoring and/or processing of the real-time analyst methodology. Hence, aspects of the monitoring and/or processing methodology also may be implemented in software.

In an example, a modified Telnet Terminal Program connects to a system element, the user logs in to the system element, and the Program causes the messages from the log file under investigation to stream past the Telnet screen as they are produced. The streaming log messages are parsed and entered into a database as they are produced, providing a real-time capture of the streaming data into a database form. Although the network element may still generate a local log file, the element need not retain it for a periodic batch download.

This approach allows a message stream to be interpreted as it occurs, reducing network traffic overloading and also producing a real-time database for up-to the-minute reports and graphs. Real-time graphs, for example, may show patterns of messages as a way of visually interpreting the pattern of failures in a system element. Time-related, periodic and bursts of messages are easily seen on such a graph. The monitoring techniques also may offer interaction with the graphs, allowing instant retrieval of the messages that produced specific aspects or points on the graphs, as a way to drill down to the raw data for more specific review or analysis by network operations personnel.

Hence, the network elements monitored by this technique send messages as they encounter hardware or software errors, and also regular reports of system status. This message stream includes call failure messages, call translation messages, call traffic reports, hardware error messages, cell status reports and others. The processing reads the system messages (e.g. that are meant to be read by a person) and extracts the failure and diagnostic information from them. Then it analyzes the database for patterns that indicate potential loss of call revenue. By analyzing the arrival rate of the messages, the count of messages, the contents of the messages and their severity level, for example, the analysis tool can reveal patterns of failure or detect or anticipate failures that would otherwise result in the network being unable to handle customers' calls. Then, it would alert the operator to a specific location or device that needed attention.

This approach provides the system operator with a real-time overview of the system health, to provide a means to make failure analysis using a database to aggregate, rank and search the messages and to alert the operator of failures through analysis of failure patterns and comparisons of current messages and their rates to historical messages and their rates. Further, since a failed or impaired network element is unable to process calls, and the analyst routine characterizes the messages as to how they affect call processing, then monitoring the message stream becomes the equivalent of preventing customer call failures due to anticipated failures of network elements. Traditional methods of monitoring are based on monitoring the changes in the rate of call failures. Calls must fail in order to affect the rate. In other words, revenue must be lost before the processing failure is detected. Monitoring the call processing hardware as in the present techniques anticipates call failures due to hardware failure, and is independent of having to count call failures in order to predict call failures Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In a cellular telephone network or other communication network, there is a need to monitor the status and health of various nodes of the network, in real time. The techniques disclosed herein use a real-time link to the network node to obtain a stream of messages for processing.

Figure 1:
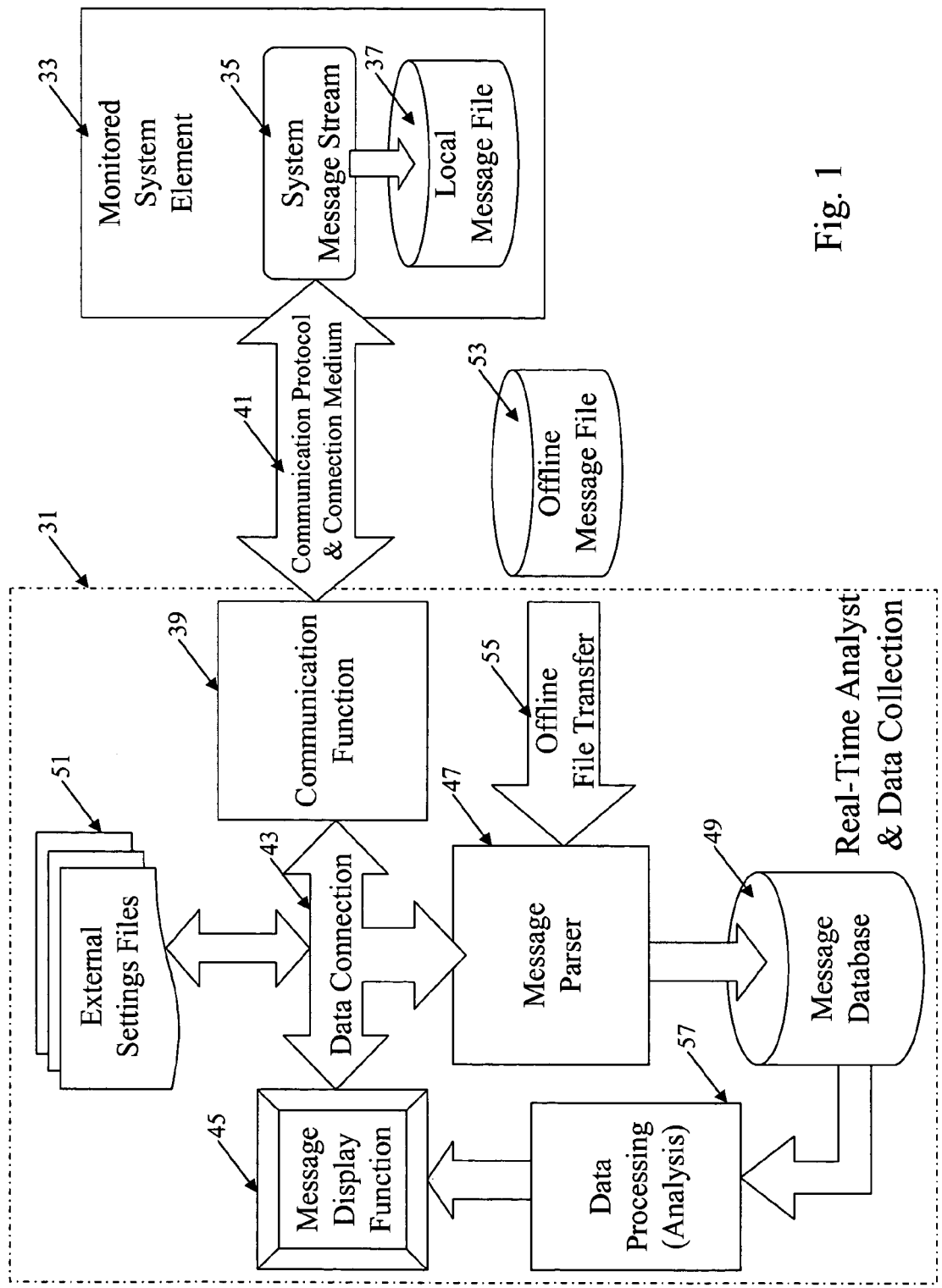
FIG. 1 is a functional block diagram/flow diagram useful in explaining real-time analyst data collection and processing operations.

Reference now is made in detail to the examples illustrated in the accompanying drawings and discussed below. FIG. 1 is a functional block diagram/flow diagram useful in explaining real-time analyst data collection and processing operations.

The real-time functionality, embodied in the analyst and data collection routine 31, monitors operations and health of a system element 33. The monitored system element 33 could be a wireless base station, a wireless or landline telephone switch, telephone interconnection such as an optical fiber or trunk group, a packet switch, a router, an optical multiplexer or cross-connect or the like. When error conditions are detected, a message is generated (usually by a diagnostic function of the network element 33) describing the error condition to a local message log file. The monitored system element 33 may also produce healthy status reports, usage logs or other useful system messages, for addition to the log file. Normally, this system message stream 35 all goes into the local message file 37 in storage in (or associated with) the network element 33, for later study.

Figure 12:
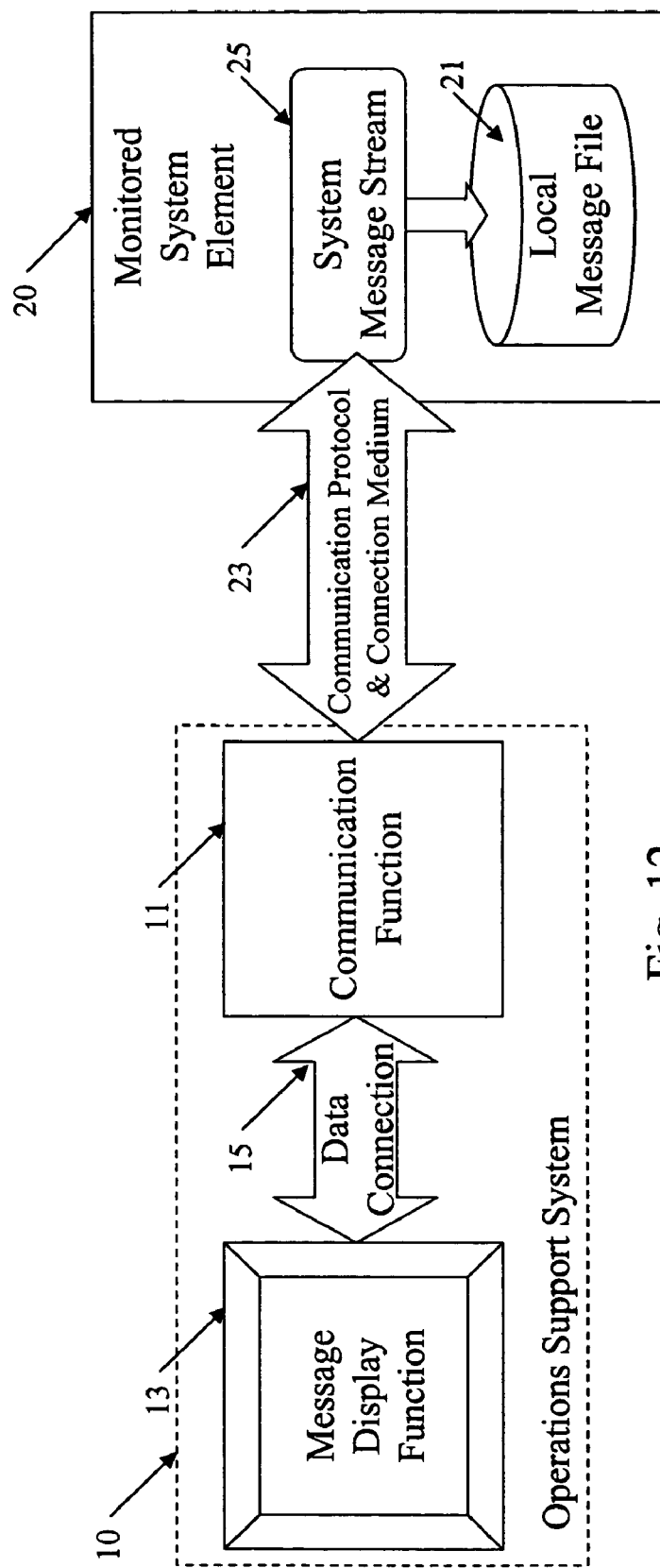
FIG. 12 is a functional block diagram/flow diagram of a standard Telnet terminal session.

The system message stream 35 can also be caused to go to an output port for viewing by a technician via a message display terminal. In existing systems (e.g. as discussed above relative to FIG. 12), the message log from the local file is periodically downloaded to a terminal for review by the technician. The data collection function of the real-time analyst routine 31, however, replaces the standard message display terminal. Because of the real-time streaming to the analyst routine 31, it may no longer be necessary to accumulate and store the log file for periodic downloading.

Data collection programming for the real-time analyst includes a communication function or program module 39, to control data communication hardware to connect to the output port of the monitored system element 33 via an appropriate communication protocol and connection medium represented by the arrow 41. This communication module could use the RS232 serial protocol of the network element or an IP-based protocol communication, such as Telnet protocol over a packet data link or network. The physical link may be a link of the network within which the element 33 provides services or a separate network, e.g. for maintenance and provisioning and the like. While connected, the illustrated connection streams the log-file messages to the routine 31 in real time, substantially as the element 33 generates the messages. In a cellular network, for example, this message stream may include call failure messages, call translation messages, call traffic reports, hardware error messages, cell status reports and others.

The communication of the system message stream 35 via the protocol/medium 41 and the communication function 39 provides a real-time communication of each message in the stream, as it is generated, from the element 33 to the real-time analyst functionality 31. As system messages from the stream 35 are received by the communication function 39, they are transferred over an internal data connection 43 to the message display function 45, for immediate viewing by an operator, if desired. The message display function 45 may be implemented as part of a graphical user interface (GUI) program module, using software to interact through standard hardware components for user input and output. Operator commands to control the message stream may be sent to the monitored system element 33 via the communication function 39 and session 41.

Additionally, messages received by the communication module 39 are sent to a message parser routine 47, for interpretation and identification of relevant data elements within each of the messages. Alarm messages, for example, include relevant data elements such as system identification, element identification, error type, error values and message severity. Other types of messages, such as traffic reports and various element "health" or status reports, may include some common elements, such as system identification and element identification, but will include other data elements unique to such other message types. The message parser 47 stores the relevant message elements in a message database 49 for retrieval and analysis.

External settings files 51 are used as inputs to the data collection function of the real-time analyst 31 to set system identification, communication protocol or issue system commands to enable the collection of the system message stream.

It may also be useful to incorporate data from historical records. In the example, older records are stored in an offline message file 53. These records may be records obtained from an earlier real-time collection or records obtained in an earlier file download (similar to FIG. 12) or by some other means. Messages from the offline file 53 are transferred to the message parser routine 47 via an offline file transfer 55. The message parser 47 interprets and identifies relevant data elements within each of the messages, in substantially the same manner as for messages collected in real time from the stream 35. The message parser 47 stores these additional message elements in the message database 49 for retrieval and analysis, so as to collect and process historical system messages without a real-time data connection.

In the example, the real-time analyst 31 is implemented as a modified Telnet Terminal Program. The real-time analyst 31 connects to the system element 33, the user logs in to the system element 33, and the modified Telnet Terminal Program causes the messages from the log file 37 under investigation to stream past the Telnet screen (via display function 45), as the element 33 produces the messages. Implementation using a modified Telnet Terminal program entails separating the Telnet session from the terminal display session. Regular Telnet terminals do not give the user a way to intercept and interpret the messages as they display to the user. Separating the two elements allows a means to intercept the messages from the terminal session as they are sent to the display so that they can be examined for content.

The streaming log messages are parsed (at 47) and entered into the database 49 as they are produced, providing a real-time capture of the streaming data into a database form. The parser module enables continuous analysis of the message stream, for example by using a buffering technique to accept a large portion of the stream, break it down to component messages and pass each one through a filter to find the relevant information. Since the messages are gathered as a whole and not accumulated line by line, there is reduced network overhead and faster interpretation time. If the messages are discontinuous in a given portion, they are appended to the beginning of the next portion until they are complete and then they are filtered. Further, the message termination character may be changed to accommodate different message types via the external settings file 51.

The message database 49 is available for program controlled processing in real time by an appropriate data processing (analysis) routine 57, which supplies the processed results to the message display function 45 for presentation to the user. In this way, the real-time messages (and optionally the historical records) may be processed for example to generate graphs or reports. Graphs, for example, can be set to update themselves and thereby display real-time processed information. The user can interact with the graph, for example, to see the system element message or messages that made any selected graph point.

The technique for real-time network monitoring of network equipment is applicable to a wide variety of different types of networks, including telephone networks and packet data networks operated by enterprises or by carriers. The example of an implementation of the technique will focus on real-time monitoring of a cellular telephone network. Hence, it may be helpful to briefly consider the structure and operation of the exemplary cellular network that is to be monitored. To that end, FIG. 2 provides a block diagram of major elements of a cellular network 200 for providing wireless communications services as well as certain systems that receive and process the data for real-time element monitoring.

Figure 2:
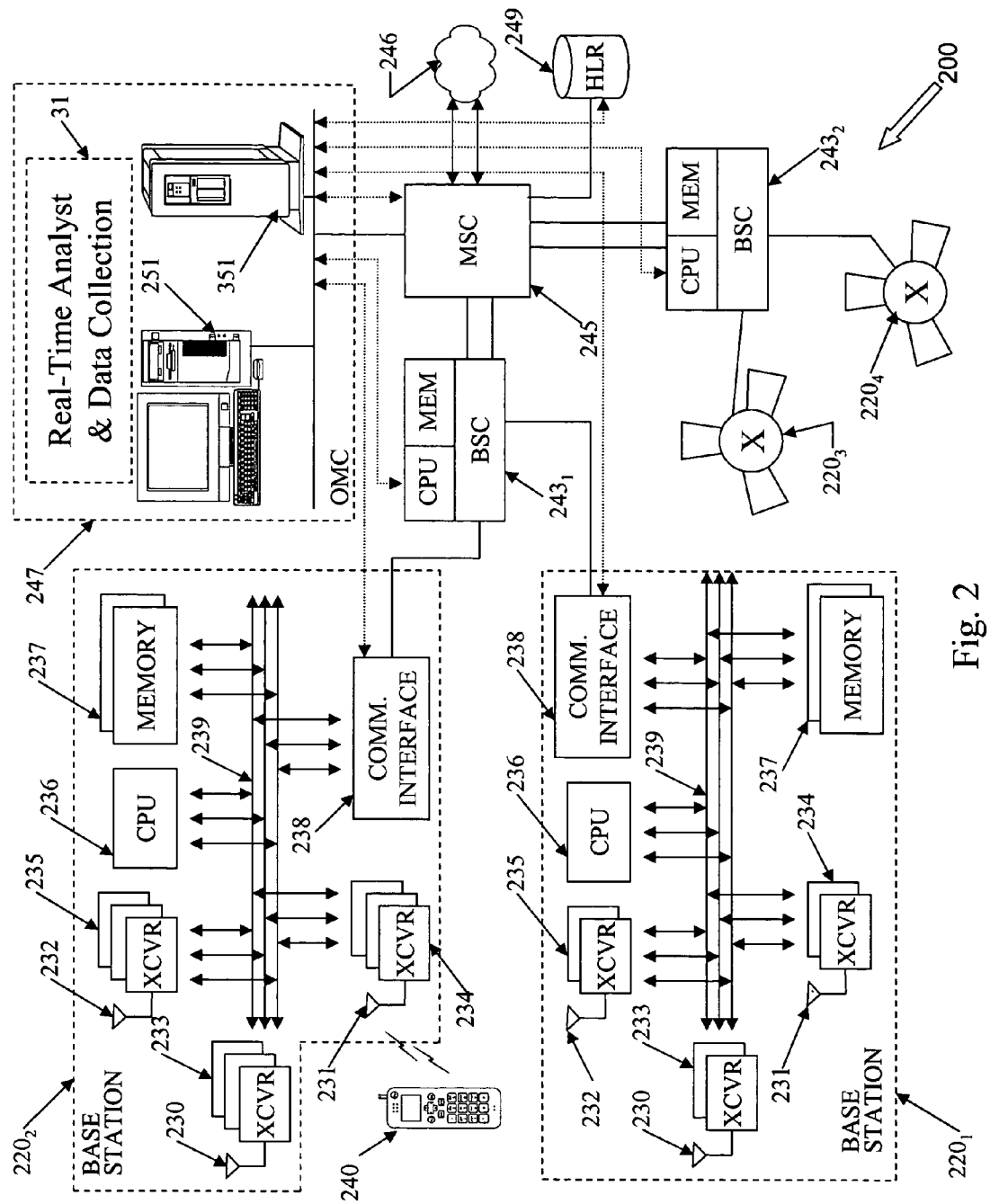
FIG. 2 is a functional block diagram of certain elements of an exemplary wireless communication network, with real-time monitoring of network elements.

The portion of the cellular network illustrated in FIG. 2 includes four base stations $220_1$ to $220_4$, two of which are shown in somewhat more detail for discussion purposes. Each base station 220 contains the antenna systems 230, 231 and 232 and associated radio transmitters and receivers (transceivers) for communication with mobile stations with respective sectors of the cell served by the base station 220. In current networks, each sector may use a single downlink carrier, although typically each sector has from 2 to 6 assigned downlink carriers and corresponding uplink carriers. In the illustrated example, the base station $220_1$ provides service using two carriers for each sector. Hence, there are two transceivers 233 associated with the first sector antenna 230, there are two transceivers 234 associated with the second sector antenna 231, and there are two transceivers 235 associated with the third sector antenna 232. By contrast, the base station $220_2$ provides service using three carriers for each sector. Hence, in the base station $220_2$, there are three transceivers 233 associated with the first sector antenna 230, there are three transceivers 234 associated with the second sector antenna 231, and there are three transceivers 235 associated with the third sector antenna 232. Except for the assigned carriers, the various transceivers are the same and operate in essentially the same manner.

The base station transceivers provide two-way communication over the air to mobile stations, represented by the exemplary station 240. The principles under discussion here are applicable to a wide range of different types of wireless communications networks. In the examples, air-link communications between the base stations 220 and the mobile stations 240 utilize code-division multiple access (CDMA) type spread spectrum communications. For example, the system might operate in accord with the IS-95 standard, or a next generation wireless network implementation might operate in accord with 3rd Generation Partnership 2 (3GPP2), Wireless IP Network Standard, 3GPP2 P.S0001-B, Version 1.0.0, ©3GPP2, version date Sep. 17, 2001.

Each base station 220 includes a central processing unit (CPU) 236 and one or more memories 237 for storing data and programming used and/or executed by the CPU 236. The memories 237 may be any known conventional memory for readable storage and/or read-write storage of code or data. The CPU 236 controls all operations of the respective base station 220. For example, under program control, the operation of the CPU 236 causes the respective base station 220 to control, monitor, and supervise calls made to and from each mobile station 240 within its serving area. As part of this operation, the CPU 236 of the base station 220 assigns and reassigns logical channels to the mobile stations 240 and monitors the signal levels to recommend hand-offs to other bases stations 220.

For purposes of the present discussion, the base station 220 may be a system element 33 monitored by the real-time analyst function 31. As it performs its control functions, the CPU 236 performs certain operations monitoring and reporting functions. For example, the CPU 236 is aware of resource usage by the various base station transceivers as well as power levels utilized in transmission or received by the respective base station transceivers. If adapted for element monitoring, the CPU also generates various health/status/alarm reports related to usage/traffic levels, alarm conditions, etc. If on-line with the analyst function, the base station communicates such messages in a real-time message stream, as discussed above. If not currently on-line, the CPU 236 initially stores the message data in one of the memories 237 as a local log file. Alternatively, the CPU 236 may provide information to a higher-level network element, for inclusion in logging and streaming reporting by the higher level element.

For customer traffic, communications to and from the base station with other network nodes utilize one or more links, typically in the form of wired or optical landline connections. For these communications, each base station 220 will include one or more interfaces 238. Signals for individual communications via the interface 238 are internally routed to and from the appropriate one of the transceivers 233-235 via an internal network, shown by way of example as a bus 239. The bus also provides control and signaling links between the transceivers and the CPU 236 as well as CPU access to the memory 237.

In the illustrated example, groups of base stations 220 connect to base station controllers (BSCs) 243. For example, base stations $220_1$ and $220_2$ connect to BSCs $243_1$, whereas base stations $220_3$ and $220_4$ connect to BSCs $243_2$. Each BSC 243 connects to a mobile switching center (MSC) 245. A BSC 243 is a centralized processor that controls the functions of a number of the base stations 220 and helps to manage how calls made by each mobile station are transferred (or "handed-off") from one serving base station 220 to another. Each wireless network equipment vender implements this function differently. Some vendors have a physical entity, which they call a BSC, while other vendors include this functionality as part of their mobile switching center (MSC).

Among its elements, the BSC includes a central processing unit (CPU) and one or more memories (MEM). Along with its other control and monitoring functions, the BSC may perform certain operations monitoring and reporting functions. For example, if adapted for element monitoring, the CPU would generate various health/status/alarm reports regarding its own operations. If the base stations are not separately capable of the desired reporting, the BSC may monitor base station operations and generate the necessary messages regarding the base stations under its control. If on-line with the analyst function, the BSC communicates the various messages in a real-time message stream, as discussed above. If not currently on-line, the CPU initially stores the message data in one of the memories of the BSC as a local log file. Alternatively, the CPU may provide information to a higher-level network element, such as the MSC, for inclusion in logging and streaming reporting by the higher level element.

The MSC 245 provides switching between the base stations 220, for example for communications between mobile subscriber stations 220, as well as switching of communications to and from other networks represented generically by the network cloud 246. For the ubiquitous telephone service, the MSC 245 provides switching between the base stations 220 and the public switched telephone network. The MSC 245 also provides switching to and from other mobile switching centers (not shown). In more advanced networks, one or more nodes of the network (not separately shown) also provide a packet switched coupling to a wide area data network, for Internet access and/or for private Intranet services.

In the example, the MSC 245 is one of the system elements 33 monitored by the real-time analyst data analysis and collection routine 31. The MSC 245 will generate various health/status/alarm messages regarding its own conditions and operations. The MSC 245 may also serve as a higher level control and reporting element for the base stations 220 and/or the BSCs 243 under its control, in which case, the MSC 245 will generate various health/status/alarm messages regarding conditions and operations of the base stations and BSCs based on information received from those lower-level network elements. If on-line with the analyst routine 31, the MSC communicates the messages in a real-time message stream, as discussed above. If not currently on-line, the MSC initially stores the message data in one of its memories as a local log file.

The carrier operating the wireless network 200 also operates a home location register (HLR) 249 that stores subscriber profiles and related call processing control information for each of that carrier's wireless subscribers and their associated digital wireless telephones 240. The HLR may reside in the home MSC, however, in the example, the HLR 249 resides in a centralized node sometimes referred to as a service control point (SCP). The SCP communicates with the MSCs 245 via data links and one or more signaling transfer points (STPs) of an out-of-band signaling system (not shown), typically, a signaling system 7 (SS7) network. As recognized in the art, the HLR 249 stores for each mobile subscriber the subscriber's mobile telephone number, the mobile identification number, and information specifying the wireless services subscribed to by the mobile subscriber, such as numeric paging or text-based paging, data communication services, multiple alerting, etc. Of note for purposes of the present discussion, the HLR 249 is another network element, involved in handling of customer traffic, which may be monitored by the real-time analyst 31.

The carrier that operates the network 200 will typically operate some type of network operations center, represented for example by the Operations-Maintenance Center (OMC) 247. The center communicates with various network elements via logically private data communications links. The illustrated network utilizes channels on the same media and through the same nodes that carry customer traffic, rather than a physically separate network. Hence, the drawing shows the center 247 with a communication link (solid line) to the MSC 245, to enable two-way data communications for the center 247 with one or more of the network elements. Other implementations might use a separate private data network, or in some case, even dial-up telephone links to one or more of the monitored network elements.

The carrier also operates a number of different systems in one or more customer service centers. These include one or more billing systems, client account administration systems, network provisioning systems such as the Mobile Telephone Administration system or "MTAS", and the like. The billing system, for example, receives usage and operations data from the MSCs 245 and processes that data to generate bills for individual customers and to forward data regarding users roaming through the carrier's service area through a clearinghouse for reconciliation. The MTAS provides data to the HLR 249 and/or to the MSCs 245 to provision services for new stations 240 and modifies provisioning data as customers change their subscriptions to obtain different sets of services from the carrier. The functions of the billing system and/or the MTAS will run on one or more computers similar to the computers 251, 351 of the OMC, although they may physically reside at a different data center. Of note for purposes of the present discussion, any such additional data processing systems operated by the carrier are additional network elements, which may be monitored by the real-time analyst 31.

In FIG. 2, the preferred location for the real-time data collection function is on a central control point such as the OMC so that messages from all monitored system elements such as BSCs and MSCs can be seen by the real-time analyst functions, which may reside on the same or a different platform. Examples of the possible real-time message streams appear as dotted line arrows in FIG. 2. Alternatively, the message stream from several OMCs can be directed to a central collection point so that a system-wide or even a network-wide view of operational status can be obtained.

In the example, the real-time analyst data analysis and collection routine 31 is implemented as one or more programs running on equipment in the OMC 247. OMC 247 will typically include a number of workstation terminals 251, for use by operations and engineering personnel of the carrier. The center also may include one or more host computers or servers 351. A data network, such as a local area network (LAN) enables two-way data communication between the terminal stations 251 and the server 351. The real-time analyst data analysis and collection routine 31 may be implemented entirely within the user's workstation 251. Alternatively, the workstation may provide the message display function and possibly the data processing (analysis) function, and the other functions of the real-time analyst data collection routine 31 would reside in the server 351.

The Message Parsing and Database Insertion functions can be separated so that a central collection point contains only the Message Database, with parsing functions installed at each OMC message origination point. This implementation has the advantage of distributing the processing load.

The real time analyst and related data collection functions may utilize any appropriate hardware. The functions may be implemented on a single computer. It is also conceivable that the storage and analysis functions could reside on more machines in a more distributed architecture. Preferred embodiments utilize general purpose computers. It is presumed that readers are familiar with the structure and operation of such electronic devices. However, for completeness, in may be helpful to provide a summary discussion here of certain elements and functions of the general purpose computers.

Figure 3:
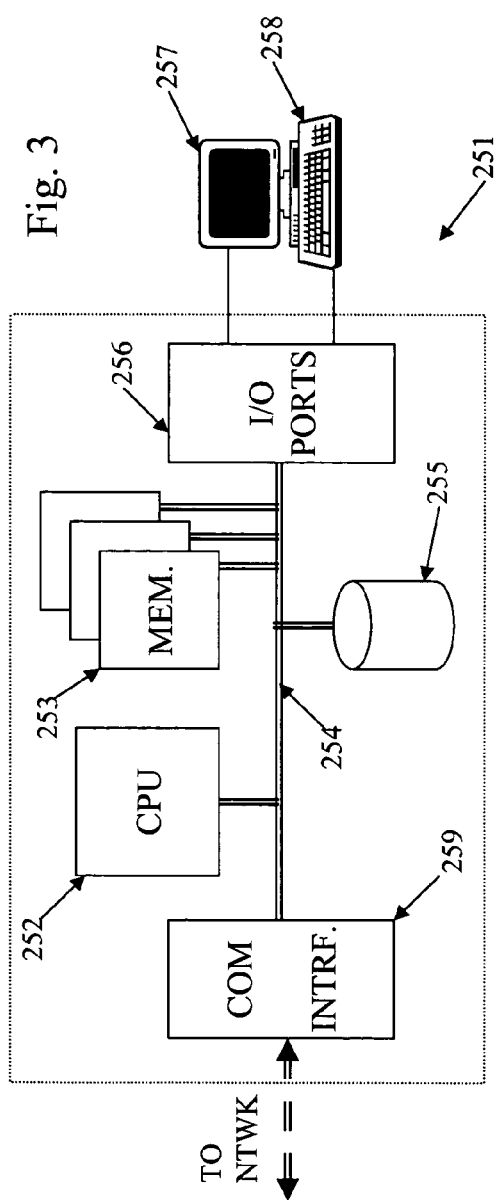
FIG. 3 is a functional block diagram of a general purpose computer for use as a workstation or the like, in the network of FIG. 2.

FIG. 3 is a functional block diagram of a PC or workstation type implementation of a system 251, which may serve as one of the user terminals, for use by carrier personnel conducting various analyses of network operations.

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions for execution and data for processing by the CPU 252.

The mass storage may include one or more magnetic disk or tape drives or optical disk drives, for storing data and instructions for use by CPU 252. For a PC, for example, at least one mass storage system 255 in the form of a disk drive or tape drive, stores the operating system and application software as well as data, such as received messages and resulting database records. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259 for data communications via a network. The interface 259 may be a modem, an Ethernet card, a serial or parallel interface or any other appropriate data communications device, for digital communications of various types via a data network. The physical communication links may be optical, wired, or wireless (e.g., via satellite or cellular network). This interface enables the terminal system 251 to communicate with the server 351 and/or directly with one or more monitored network elements 33.

The computer system 251 may further include appropriate input/output ports 256 for interconnection with a display 257 and a keyboard 258 serving as physical hardware elements of the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a touchpad, a trackball, a stylus, or a set of cursor direction keys. The links of the peripherals 257, 258 to the system 251 may be wired connections or use wireless communications.

Each computer system 251 runs a variety of applications programs and stores data, enabling one or more interactions via the user interface, provided through elements such as 257 and 258, and/or over the network to implement the desired processing for the real-time monitoring functions. The workstation computer 251 for example, might run a general purpose browser application, and may run other general-purpose applications, such as an e-mail program, for the business functions of the operations personnel. For purposes of the present discussion, the real-time analyst and data collection routine 31 may run as one or more application programs on the workstation computer 251. For example, in FIG. 3, The real-time data collection function would be running in memory 253, controlled by the CPU 252, reading the message stream from the communication interface 259 over the system bus 254, parsing the message data and inserting database records in the storage 255. If the terminal 251 also provides the analysis processing, then the CPU 252 would pull records from the database in storage 255, process relevant information from the records, generate desired graphs or reports and send the results over the bus 254 through the appropriate one of the I/O ports 257 to the display 257, for review by the user.

Alternatively, portions of the routine 31 may run on the server 351, such as the communication function, the parser and the database. In which case others aspects of the routine 31, such as the processing and display functions, would run on the workstation computer 251. If the server 351 performed the data processing analysis of the parsed message data from the database, then the terminal browser and a multimedia plug-in might be used to access results in a standard streaming multimedia format.

Figure 4:
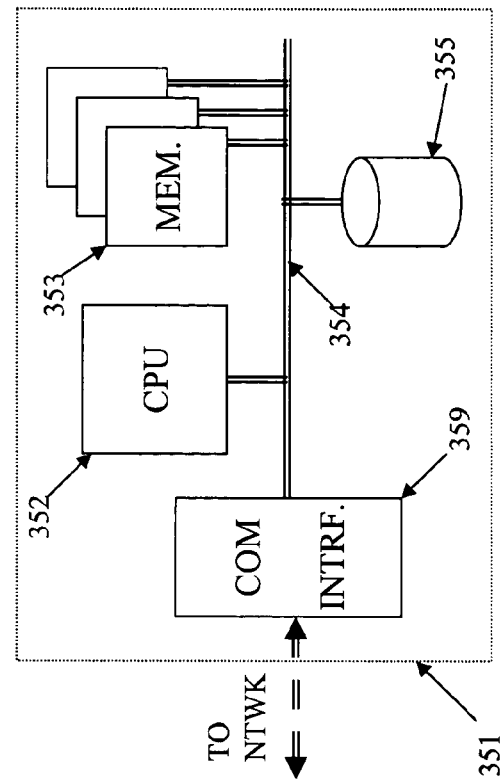
FIG. 4 is a functional block diagram of a general purpose computer for use as a server or host computer or the like, in the network of FIG. 2.

FIG. 4 is a functional block diagram of a general purpose computer system 351, which may perform the functions of the host or server 351. The server 351 may store the offline message file, or the server may act as a central collection point for receiving and parsing real-time messages for storage in the database. It may also be possible that the server executes the processing of that data to produce desired user outputs, such as the graphs and reports for real-time viewing by the operations personnel at one or more workstations 251.

The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. If implementing the analyst routine in a client-server fashion, at least one mass storage system 355, preferably in the form of a disk drive or tape drive, stores the parsed message database 49. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

The system 351 also includes one or more input/output interfaces for communications, shown by way of example as an interface 359 for data communications via the network.

The interface 359 may be a modem, an Ethernet card or any other appropriate data communications device. The physical communication link may be optical, wired, or wireless (e.g., via satellite or cellular network). Alternatively, the computer system may comprise a mainframe or other type of host computer system capable of web-based communications via the OMC LAN, an Intranet or the Internet. The data communications interface 359 enables communications with the monitored networks elements 33 (FIG. 1), and the same or another interface provides data communications with the terminal station(s) 251.

Although not shown, the system 351 may further include appropriate input/output ports for interconnection with a local display and a keyboard or the like serving as a local user interface for programming purposes. Alternatively, the server operations personnel may interact with the system 351 for control and programming of the system from a terminal 251 or from a remote terminal device via the Internet or some other network link. For example, if the analyst routine runs in a user terminal device 251, then the server 351 may itself be a monitored network element 33 streaming messages to the terminal for processing.

The computer system 351 runs a variety of applications programs and stores data for processing and/or presentation to users. In a client-server implementation of the real-time analysis and data collection routine 31, the computer system 351 runs at least the data collection, parsing and database management routines and stores the accumulated message data in the database 49. The server may also store the offline message data file 53. The server 351 may run a data processing analysis routine. In FIG. 4, the real-time data collection function would be running in server memory 353, controlled by the server CPU 352, reading the message stream from the communication interface 359 over the system bus 354 and inserting records in the database maintained in the storage 355. However, where such functions are performed on a server, the display of the streaming messages, graphs and other processed data occurs on a separate user terminal or "client" device in communication with the server 351 via a network link. A typical client device is a PC, similar to the system 251 of FIG. 3. For such an implementation, the server also runs an appropriate application to allow user access via the client workstations 251. Those skilled in the art will recognize that the computer system 351 may run other programs and/or host other network operations applications. Also, the system 351 may be implemented as a single computer system or as a distributed system having multiple appearances at different nodes on the Internet or the service provider's Intranet.

The components contained in the computer systems 251 and 351 are those typically found in general purpose computer systems used as servers, workstations, personal computers, network terminals, and the like. In fact, these components are intended to represent a broad category of such computer components that are well known in the art. Those skilled in the art will recognize that modem networks also use general purpose computers to implement certain traffic handling elements of the network, such as the HLR 249. Where used for such an application, the general purpose computer would be a monitored network element 33.

Aspects of real-time analyst processing may relate to a method, to a network or to systems, for performing the functions of the real-time data collection and analysis (e.g. as in FIG. 1) on systems such as those of FIGS. 2 to 4. Other aspects may relate to software products, typically carried on one or more machine-readable media, which cause a computer or network to perform the some or all of the real-time analyst functions discussed above.

Terms such as "machine-readable medium" and "computer-readable medium" as used herein refer to any medium that participates in providing instructions and/or data to a programmable processor, such as CPUs 236, 252 and 352, or CPUs in the BSCs or in the MSC, for execution or other processing. Such a medium may take many forms, including but not limited to, non-volatile media, volatile media, and transmission media. Non-volatile media include, for example, optical or magnetic disks, such as storage device 255 or 355. Volatile media include dynamic memory, such as main memory 237, 253 or 353. Physical transmission media include coaxial cables; copper wire and fiber optics, including wired and wireless links of the network (FIG. 2) and the wires that comprise a bus such as 239, 254 or 354. Transmission media, however, can also take the form of electric or electromagnetic signals, or acoustic or light waves such as those generated during radio frequency (RF) and infrared (IR) data communications. Hence, common forms of machine-readable media include, for example, a floppy disk, a flexible disk, hard disk, magnetic tape, any other magnetic medium, a CD or CD-ROM, DVD or DVD-ROM, any other optical medium, punch cards, paper tape, any other physical medium with patterns of holes, a RAM, a PROM, and EPROM, a FLASH-EPROM, a cache memory, any other memory chip or cartridge, a carrier wave transporting data or instructions, physical links bearing such a carrier wave, or any other medium from which a computer or the like can read in order to read or recover carried information.

Various forms of machine-readable media may be involved in carrying one or more sequences of one or more instructions to a processor for execution. For example, all or portions of the software to perform the functions of the real-time analyst routine 31 may at times be communicated through the Internet, an Intranet, the monitored network (FIG. 2), or various other telecommunication networks. Such communications, for example, may serve to load the software from another computer (not shown) into the server 351, or into the terminal workstation station 251, or into another network element.

Figure 5:
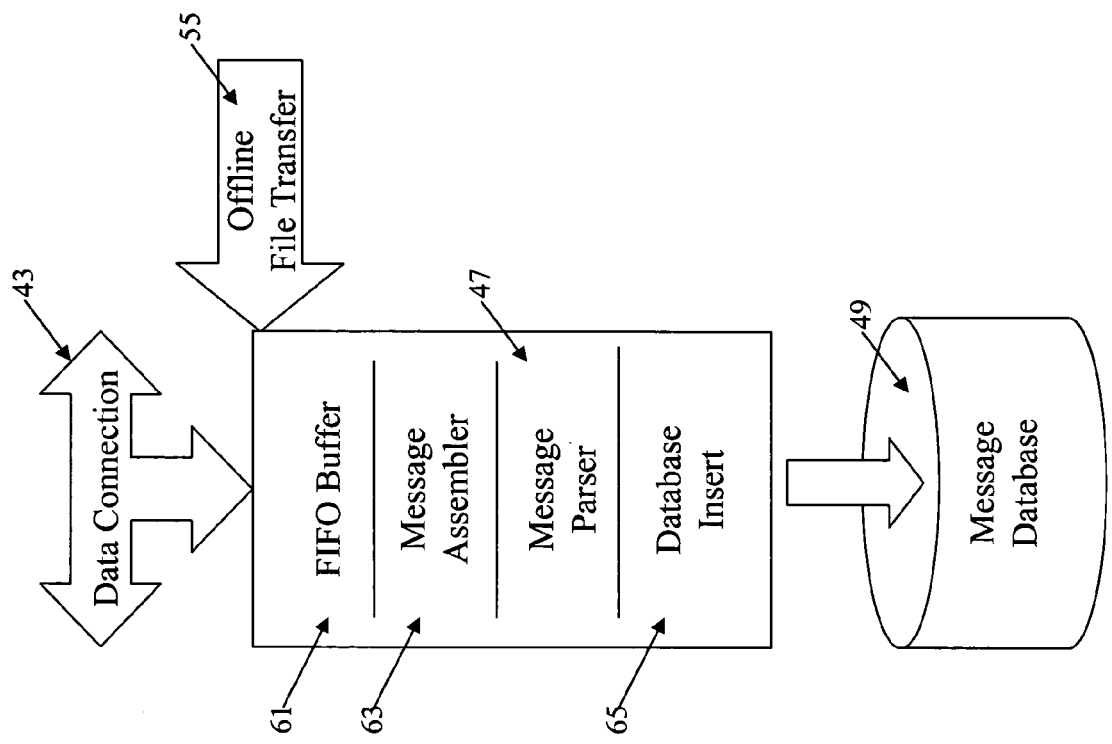
FIG. 5 is a functional block diagram/flow diagram providing more details regarding the processing of the incoming real-time message stream.

It may be helpful now to consider more detailed examples of implementations of several aspects of the real-time processing. FIG. 5 shows details of an example of the method of dealing with the real-time message stream from the monitored network element. Since the stream is continuous, it is necessary to ensure no messages are lost while message parsing and message database entry operations take place.

As shown, the incoming message stream, whether streaming in from the data connection 43 or coming from the offline file transfer 55, is fed into a First-In First Out (FIFO) buffer 61 of sufficient size. The message assembler function 63 identifies entire messages in the FIFO buffer and transfers them out to the message parser function 47. The size of data compiled in the FIFO buffer 61 is reduced by the amount of the message until the last whole message is found. Remnants of messages in the buffer 61 are prepended to data coming into the FIFO buffer and re-submitted to the parsing function 63. In this way all the messages in the stream(s) are captured.

The message parser function 47 identifies components of the message, as discussed earlier, and it formats them for storage in message database fields or tables by the database insert function 65. The database insert function 65 populates the parsed data from the messages into the appropriate fields in the message records of the database 49.

The message parser function 47 also identifies the message type, for each received message, and uses this information to keep a tally of how the message type affects system operation.

This is part of the methods used to create alarm conditions from non-alarm messages. For example, in a wireless telephone system 200, call failure messages of all types can be broadly characterized as lost calls, ineffective call set-up attempts, or as having no effect on a call. When the lost call rate for a given system element changes dramatically as compared to its stored failure rate, an alarm can be issued to notify system operators or maintenance personnel to investigate the system element using the messages stored in the message database 49.

Figure 6:
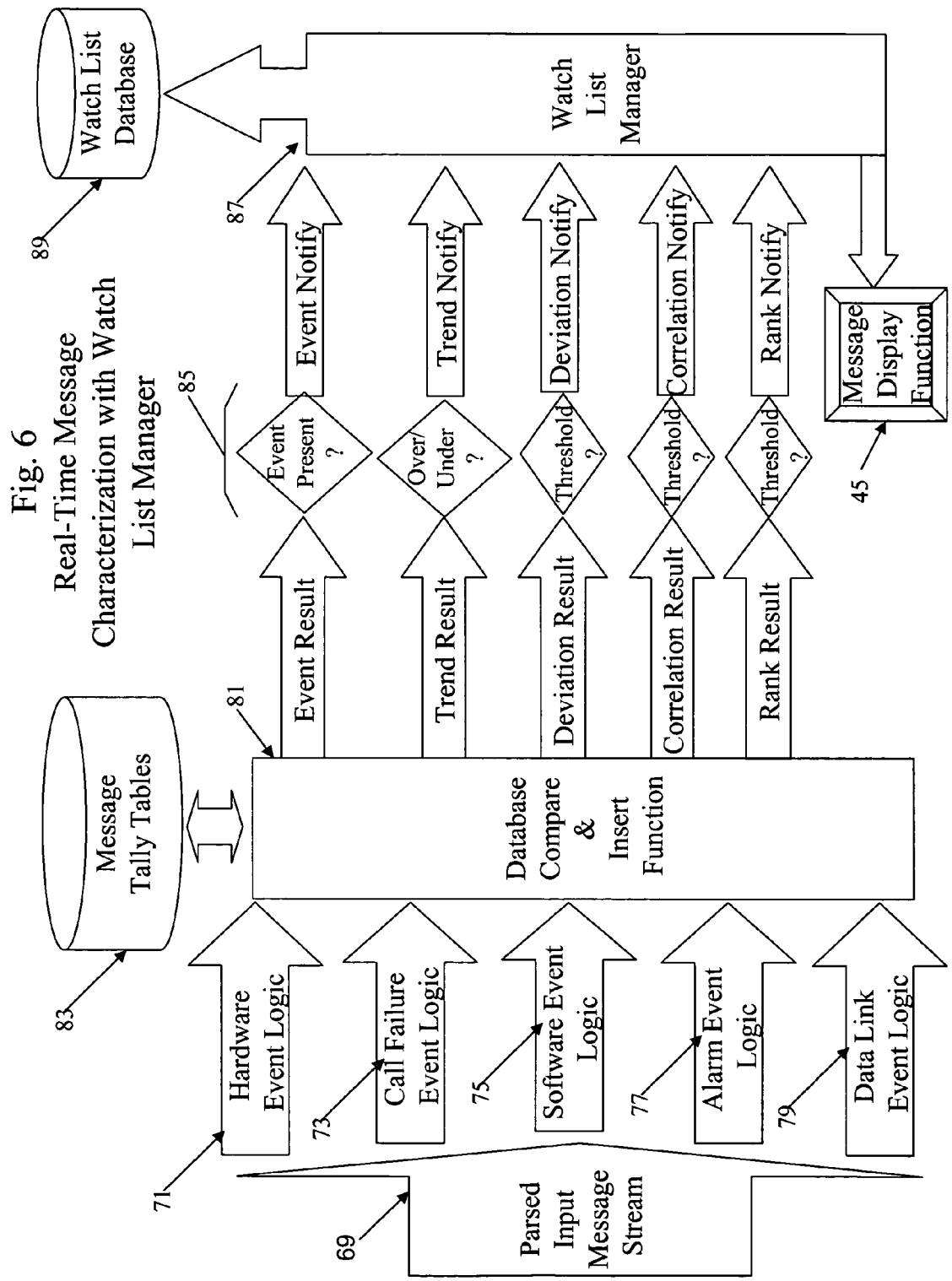
FIG. 6 is a functional block diagram/flow diagram of the real-time message characterization with watch list manager function.

FIG. 6 illustrates how messages received by the parsing function 47 are processed to create alarm conditions from non-alarm messages, which may be one of the analyst processing functions.

As the message stream is parsed into separate messages, corresponding logic functions determine if the message type has an effect on lost calls, on ineffective call setup attempts or does not affect call processing directly. In the illustration, this processing begins with the parsed input message stream 69 from the parser (or from the message database). The exemplary processing logic includes hardware event logic 71, call failure event logic 73, software event logic 75, alarm event logic 77, and data link event logic 79. These or similar logic functions detect the type of messages received in the stream 69 and supply indications of detected message types to a routine 81 to a database comparison and insert function. The system maintains counts (tallies) of messages received of each type, and the routine stores that information in a tally database 83. Part of the function of the routine 81 is to analyze the messages and/or the tallies accumulated in the database 83.

For example, hardware event messages about out-of-tolerance RF levels could indicate that calls could be lost due to the failure. Some messages indicate by their presence an effect on call processing, such as those concerning loss of power to the cell site or loss of control message integrity. These messages are given more weight when determining if a threshold has been reached. A weighting method could be employed to allow a high quantity of low-severity messages to send an alarm indicating maintenance is needed.

Statistical and probabilistic methods could be used to activate an alarm. A message arrival count could deviate from the historical message count for a similar day of the week and time of day. Ranking of failure messages by element and type could determine which system elements have the most trouble. Several messages of different types about the same base station could indicate trouble. For example, a high software failure rate combined with a high hardware error rate could cause a high call failure rate.

The database compare and insert function 81 compares the failure rate in a given time segment to a historical failure rate in the same time segment, as kept in the message tally tables 83. This function 81 also performs rate, absolute level, deviation and correlation analysis of the current time segment against the historical values in the message tally tables 83. If a difference or threshold is found (by decisions collectively indicated at 85), a notification message is sent to the watch list manager function 87 to alert the operator to a system element in need of attention, for example, via an output through the display function 45. The watch list manager also records such alarm event notifications in a watch list database 89.

Figure 7:
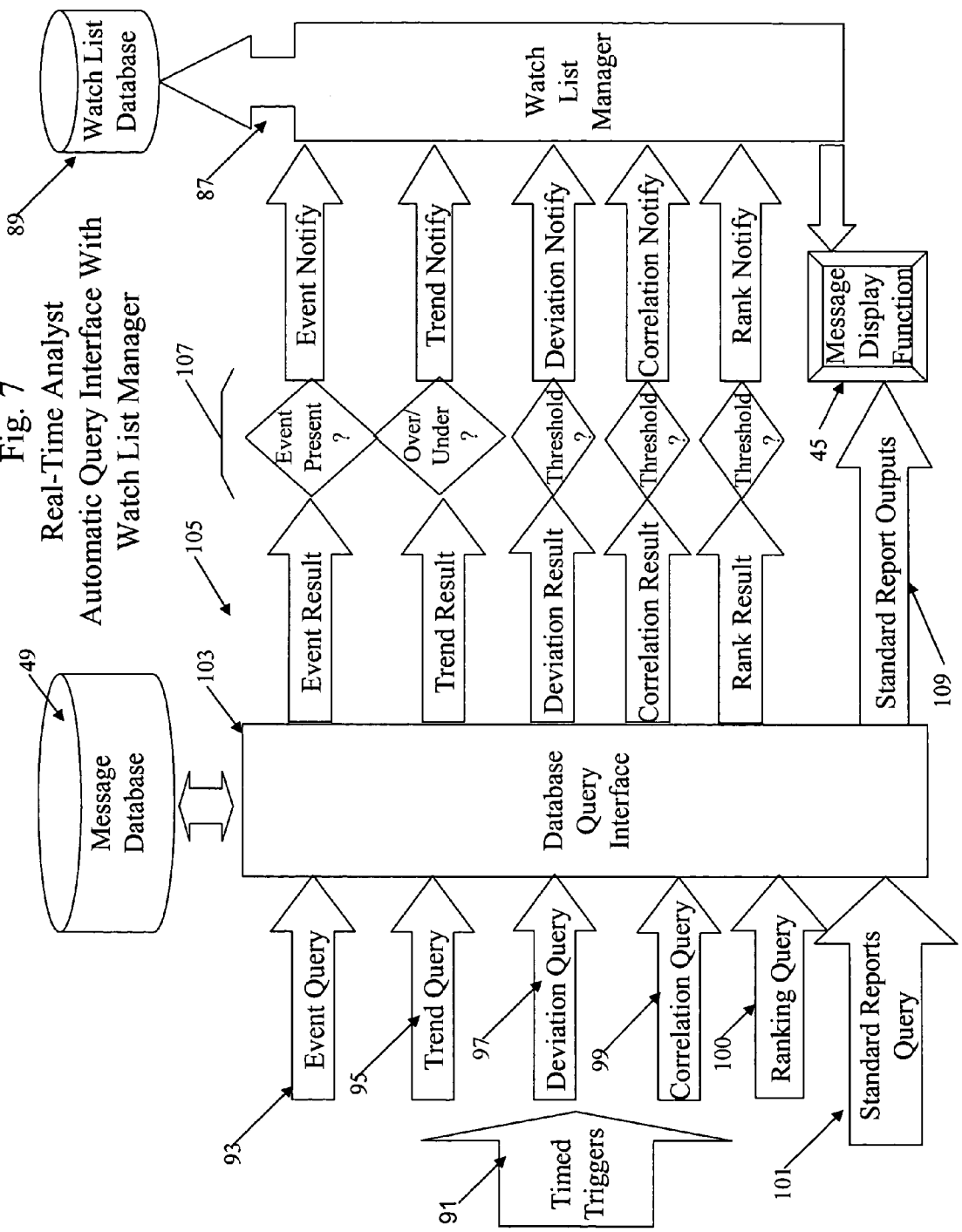
FIG. 7 is a functional block diagram/flow diagram of the real-time analyst automatic query interface with watch list manager function.

FIG. 7 illustrates how messages stored in the message database are used to create standard reports or to identify system elements in need of attention or repair. On a periodic basis, any one of a number of timed trigger events 91 causes a specific query to run against the message database 49. In the example, a trigger may produce an event query 93, a trend query 95, a deviation query 97, a correlation query 99 and a ranking query 100. Another of the triggers 91 may indicate a request 101 for one or more standard reports. Of course, the software may support a variety of other types of queries. A database query routine 103 processes the records in the message database 49 to generate the results corresponding to each received query.

Result statistics (collectively shown at 105) gathered by the queries are compared to event and count thresholds (collectively at 107). If an event or count threshold is exceeded, a message is sent to the watch list manager function 87 to alert the operator to a system element in need of attention, for example, via an output through the display function 45. The watch list manager also records such alarm event notifications in the watch list database 89.

Daily Standard summary reports 109 will also be generated by the database query routine 103. The may be output through the display function 45, or a printer or other convenient means.

The automatic query interface (FIG. 7) differs from the characterization method (FIG. 6) in that the characterization method uses time segments of the day for comparison to historical counts, whereas the automatic function calculates counts for a given period without comparison. The automatic function operates on a longer time span, i.e. hourly segments, while the characterization function could operate in a smaller time span of 10 minute periods for a faster response to system problems.

Figure 8:
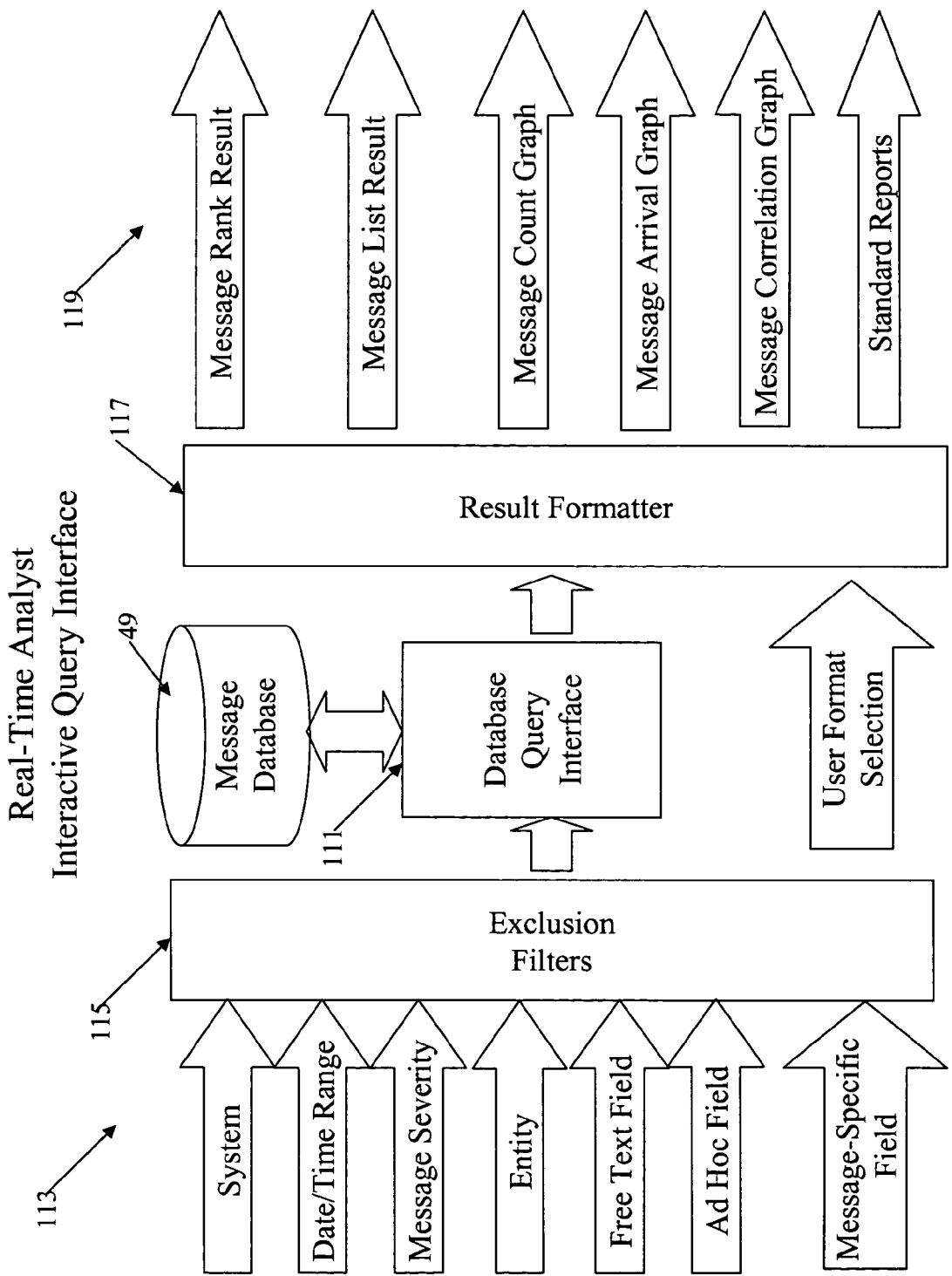
FIG. 8 is a functional block diagram/flow diagram of the real-time analyst interactive query interface function.

FIG. 8 depicts an interactive query interface 111, which is a way to simplify and organize the user queries 113 into the message database 49. It presents to the operator a set of choices which determine the values of the database query and formats the choices into a standard Structured Query Language (SQL) statement. An exclusion filter 115 allows query results to be limited individually or in combination. The interactive query interface 111 presents the database fields and allows content choices to be selected or entered. The user can choose a report output format such as a text listing or results graph. The SQL query is submitted to the database 49, and a format routine 117 formats the resulting record set 119 according to the user selection.

Figure 9:
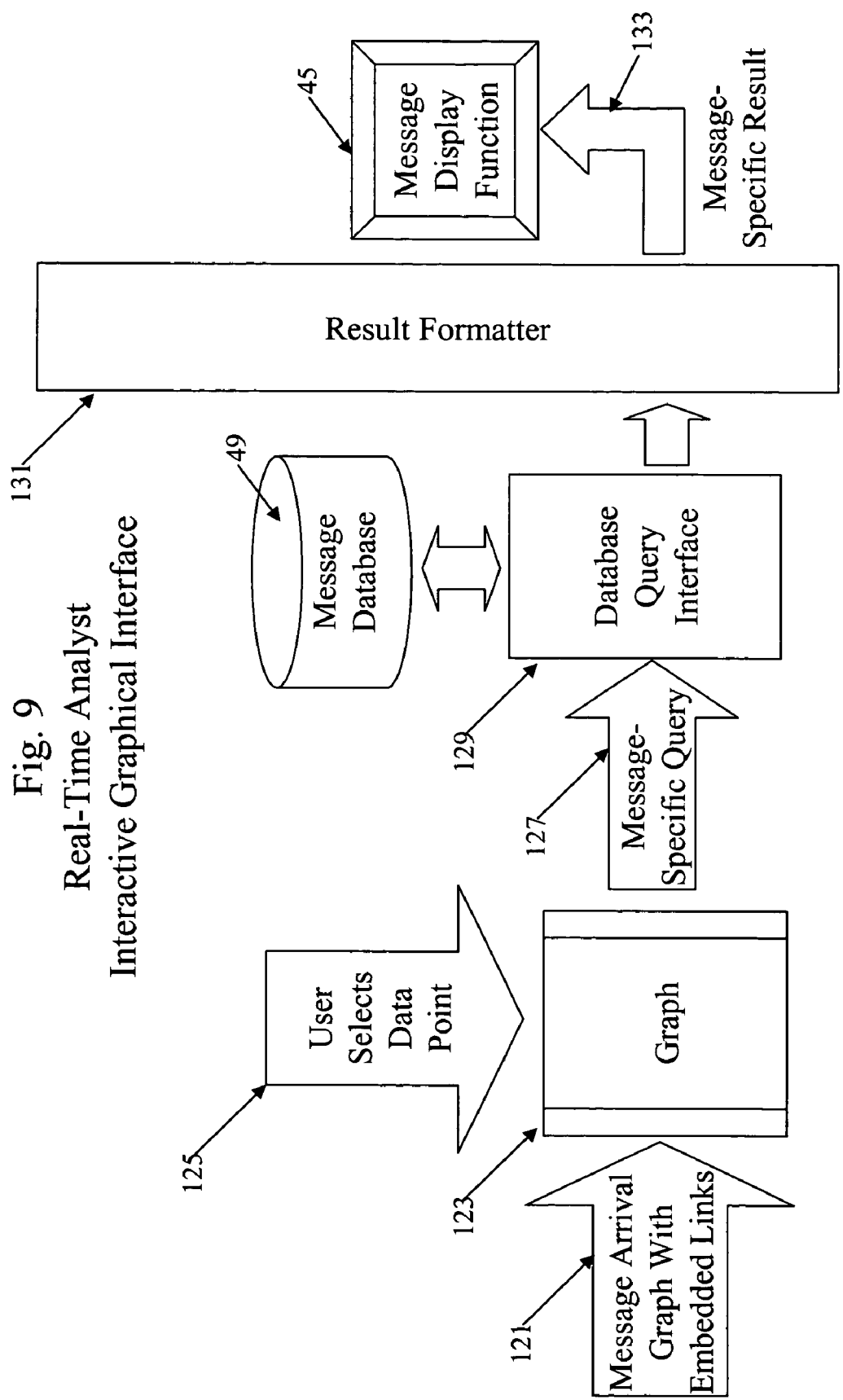
FIG. 9 is a functional block diagram/flow diagram of the real-time analyst interactive graphical interface function.

FIG. 9 depicts a drill-down technique for providing database queries directly from the output graph of a previous query. In response to the arrival of messages as a result of an initial query (at 121), the display (see FIG. 1) in step 123 outputs one or more message tallies over time (or other graphic parameters) by their corresponding system element. The points on the displayed graph are clickable (hot linked). If the user desires to see the message(s) that created each point, the user only has to click on the point at step 125, to enter the selection of that data point. In response, the system sends sufficient data (at 172) associated with that point to the database query interface 129. The database query interface 129 processes the point data to develop a query and presents the query to the message database 49. A format routine 131 formats the resulting record set from the database, according to the user selection, for output (at 133) to the user, typically via the display function 45.

It should be noted that several functions attributed above to similarly named but differently numbered processing routines typically will be combined in a single program or module. For example, the functions of the different database query interfaces, 103, 111 and 129 may be implemented together in one query processing and database interface routine.

As shown by the above discussion, the network elements monitored by real-time analyst 31 send messages as they encounter hardware or software errors, and also send regular report messages regarding system status. There is no polling involved, and the communication is in real-time rather than relying on infrequent batch file downloads. The analyst 31 reads the system messages (that otherwise are meant to be read by a person) and extracts the relevant failure and diagnostic information from them. The routine 31 analyzes the database for patterns that indicate potential loss of call revenue. By analyzing the arrival rate of the messages, the count of messages, the contents of the messages and their severity level, for example, the real-time analyst 31 detects or anticipates failures that would result in network element(s) being unable to handle customers' calls. Then it would alert operations personnel to a specific location or device that needed attention. The real time analyst provides the system operator with a real-time overview of the system health, to provide a means to make failure analysis using a database to aggregate, rank and search the messages and to alert the operations personnel of failures through analysis of failure related message patterns and comparisons of current messages and their rates to historical messages and their rates. Further, since a failed or impaired network element is unable to process calls, and the real time analyst characterizes the messages as to how they affect call processing, the monitoring of the message stream allows operations personnel to analyze and take steps to prevent customer call failures due to failed network elements.

The flexible database query Interface allows the user to submit standardized and free-form queries to the database. The flexible report outputs section includes standardized reports, Ad Hoc reports, listing reports, ranking reports, periodic analysis of time series data, interactive graphic outputs showing message occurrences versus time, graphic outputs showing the count of messages per unit time.

The database may be queried via a direct interface or via a web server so that information is available to other monitoring sites, as allowed by network design. The corresponding web pages showing system element status can be made self-refreshing. They will cause the data displayed or listed on them to update automatically on a regular periodic basis so that once a query page is created, the information on it is kept current without further intervention by the requester. The status of the element shown in the web page is portrayed in near real time, depending on the refresh rate of the web page.

The real time analyst 31 provides an interactive graphic display of messages. For example, when a failure message about cell 13 occurs, it is displayed on a X-Y graph at the intersection of the cell's number and the message's time. As more failures occur, they are displayed, and a pattern of failure throughout the day becomes apparent. To see what caused the failure pattern, the user can click on the graph points directly and receive a display of the corresponding messages stored in the database. The database filters can be set to display matching error messages on other cells, or messages pertaining to that cell.

The graphic display of message rate and trend of the data matching the query may also show improvement or failure of the system as a function of time. This method displays regular patterns such as weekly variations and irregularities such as outages or the results of maintenance.

In the real-time analyst 31, the database stores message contents for query processing. Previous methods involved searching through the original message file, usually stored on the source computer or network node. Searching from the source loads the source processor. The source files are not stored for very long in order to save space. Using an external database, as in the analyst 31, improves both of these situations. A database offers more intricate searching abilities and can answer more complicated data queries than command line methods of searching at the source. The message contents may be stored in a compressed or symbolic way so that they require less storage space than the original message. For example, instead of storing the string 'data link 1 disconnected at 12:34:56 PM Apr. 4, 2003' the database may store a 1 in a field denoting datalink number and a Boolean 'False' in a status field and a numeric representation of the time and date in a timestamp field. When the data is requested from the database about the datalink, the report formatting routines restore the field data to a useful readable phrase such as the original form of the message.

The examples also support both fixed and flexible database query methods in the user interface. Standardized views of the data are available directly from the interface. Customized or ad hoc views of the data are available through menu choices on the interface. Ranking of message counts or message types shows patterns of failure based on the amount or type of messages generated by the system elements. Displaying result data in ascending or descending rank or time order shows patterns of failure by urgency or immediacy.

The database processing may also offer a negation ("not equal to") choice that removes matching data from the query results. Eliminating a failure pattern allows other patterns that may have been masked to emerge. For instance, removing a high failure rate system element from the result data allows the patterns of information in the small failure rate items to stand out.

The analyst 31 may also use of an external file (known as a 'personality' file) that designates the internal system names, database file paths and program settings. Through these external files, the main program operational states can be changed or set without recompiling the program itself.

An output file may be used to collect messages not used by the parser. The file my be examined for additional failure messages to be monitored, or to see if patterns of messages currently ignored should be parsed, or to search for unique messages pertaining to system operation.

In the examples, the analyst 31 monitored a network element 33. However, the collection and distribution portions of the program are readily scalable to monitoring of a number of such elements. In order to monitor several network elements, several sessions 41 are started which share a common database or databases 49. The data query interface of any of these sessions shows information about any or all of the system elements 33 in the database 49. The scalability of the data collection and distribution methods can be expanded to include small data-streaming and parsing programs (such as UNIX 'daemons') that reside on system elements. The streams from these system elements can be directed to a central collection database via network protocols such as IP sockets. The central collection database is queried via a web interface to provide remote monitoring, reporting and pattern recognition.

It may be helpful to consider a specific example of a procedure that may be automated using the real-time analyst. As such an example, consider a procedure to isolate a Hardware Error Handler (HEH) trouble.

Figure 10:
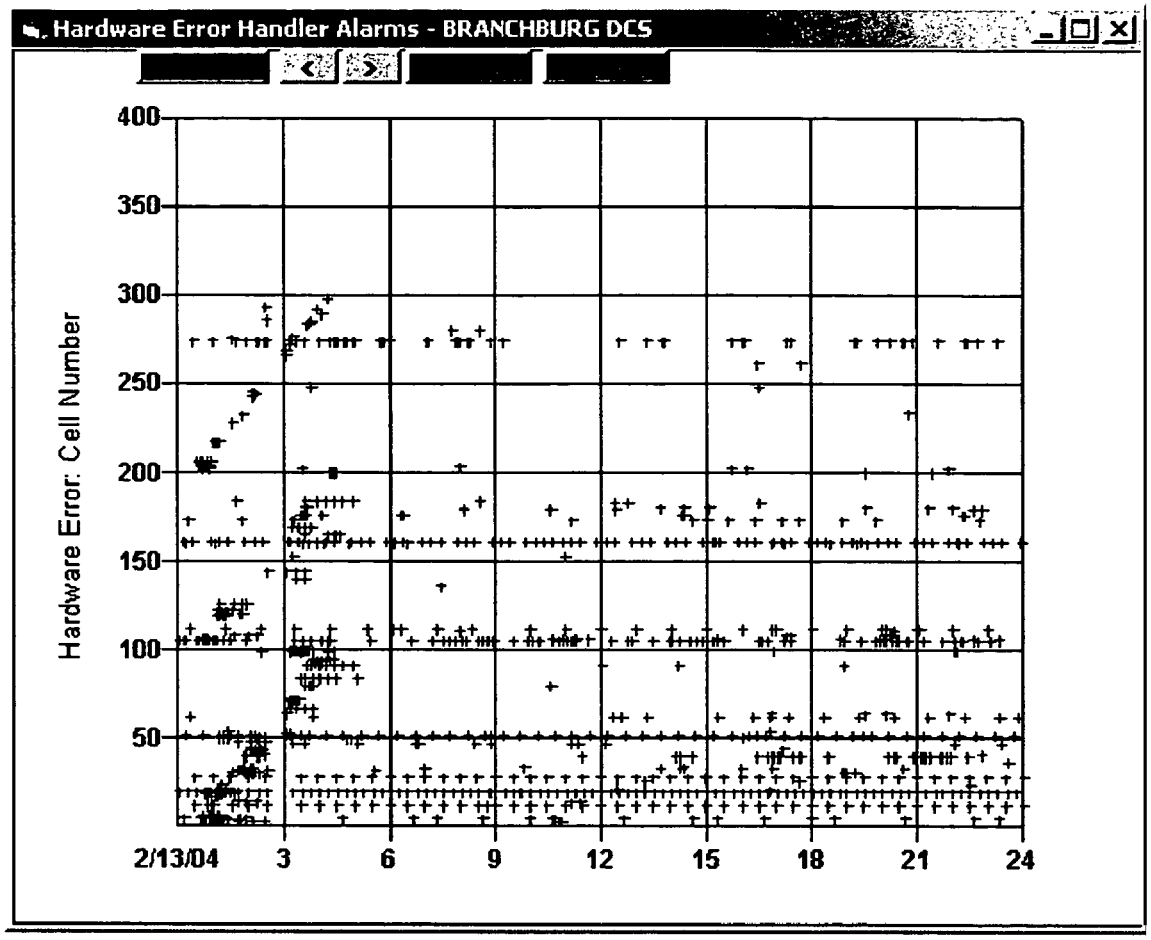
FIG. 10 illustrates a graph of arrival times of Hardware Error Handler (HEH) messages.

FIG. 10 represents a display of a graph, which plots the arrival time of each HEH message across the X-Axis, and the cell number of each message on the Y-Axis. In order to properly allocate and prioritize repair resources, the question that operations personnel must address is "Which cells are in the worst trouble?" The graph shows too much information, including bursts of messages in the early morning, and several cells that transmit error messages throughout the entire day.

Figure 11A:
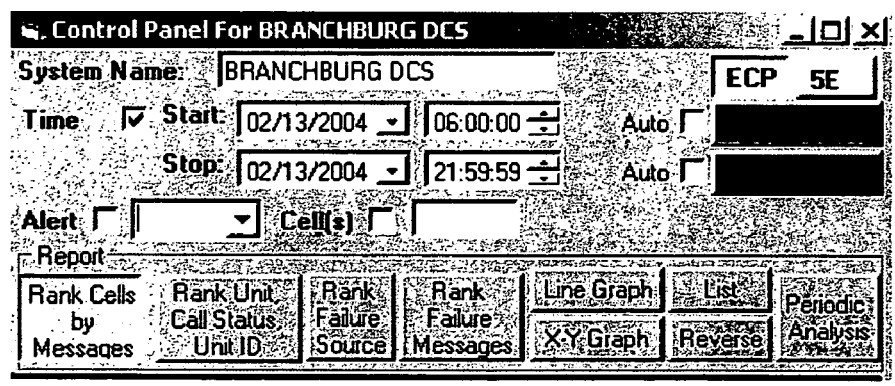
FIGS. 11A to 11N show displays as they might appear to a user of the real-time analyst, during a process for analyzing Hardware Error Handler (HEH) troubles.
Figure 11E:
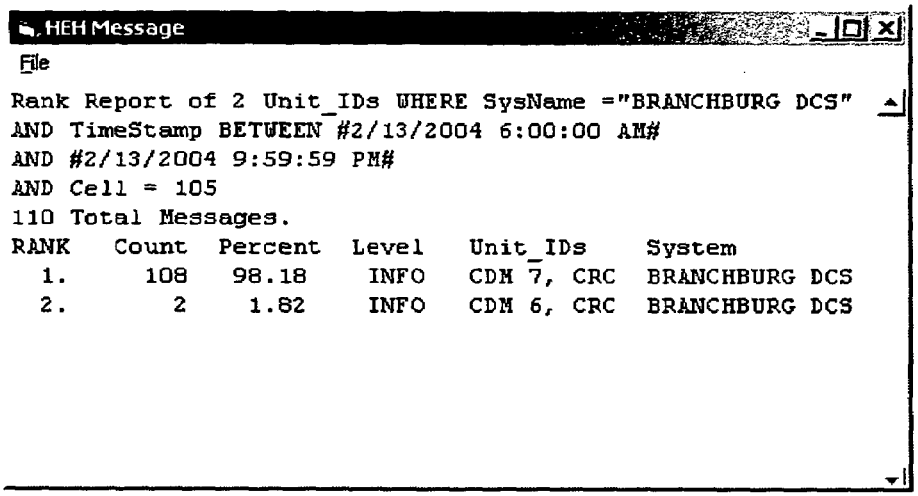
Figure 11F:
Figure 11G:
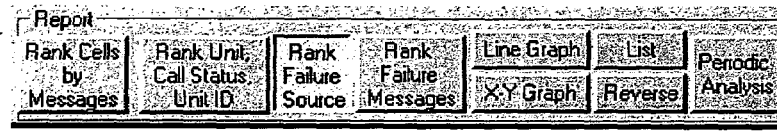
Figure 11H:
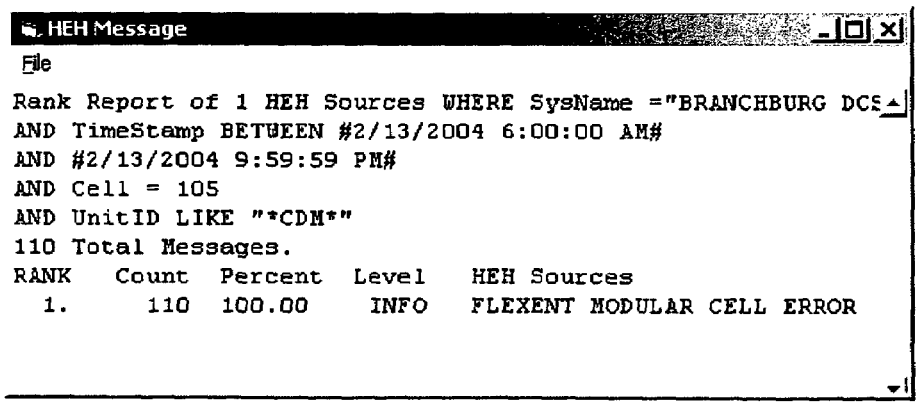
Figure 11I:
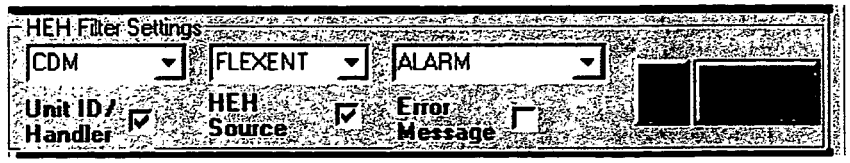
Figure 11J:
Figure 11L:
Figure 11M:
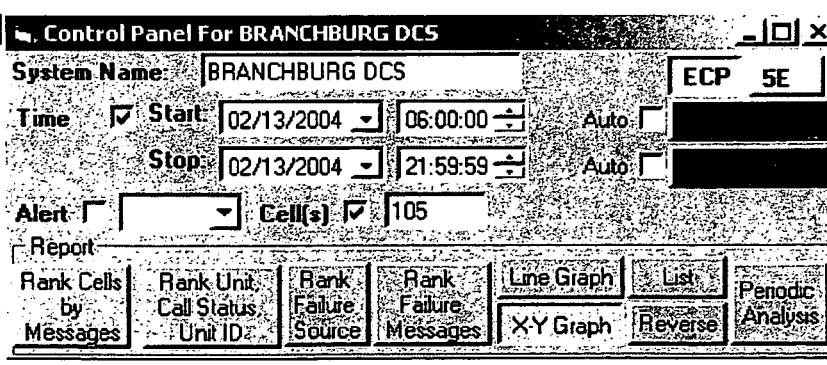
Figure 11N:
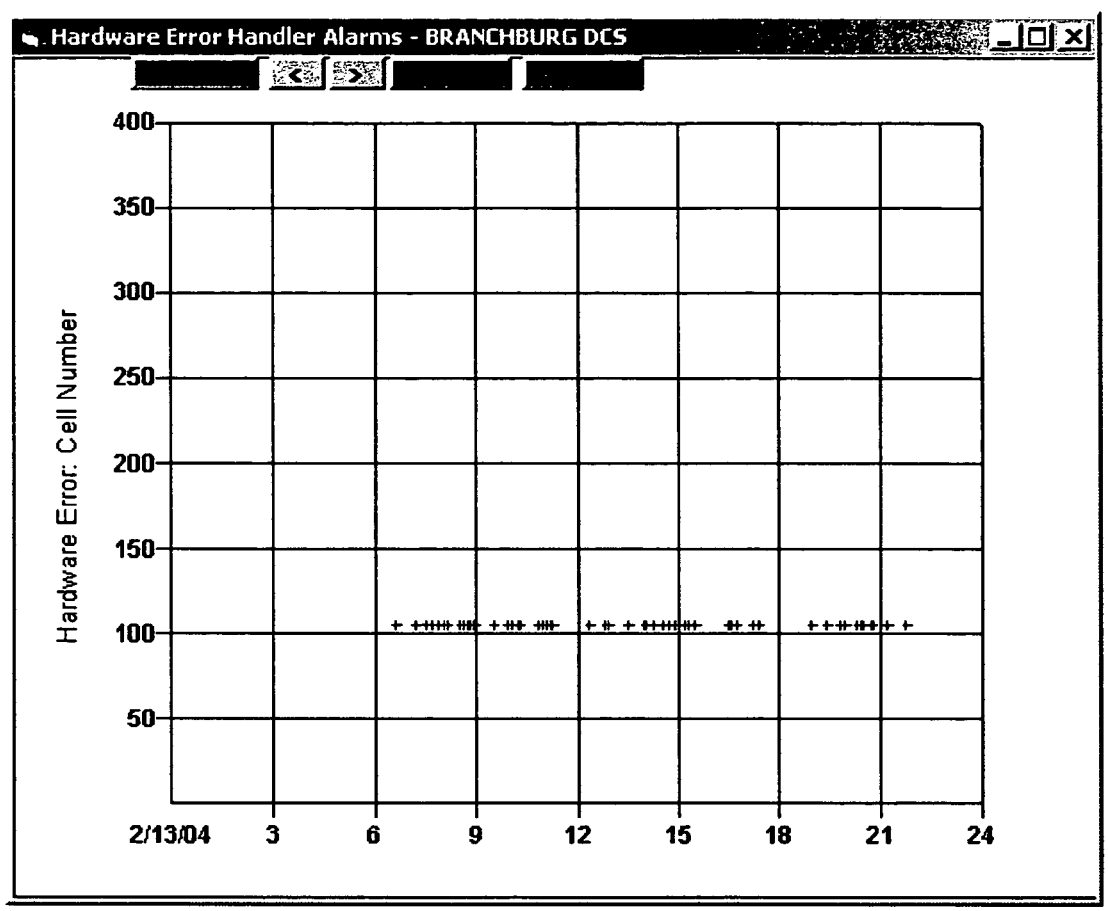

FIGS. 11A to 11N illustrate a series of displays, through which a user interacts with the database to analyze the HEH issue. This example relates to a procedure to isolate a Hardware Error Handler (HEH) trouble. It alternates between ranking messages and choosing the top message in each rank as an input to a more specialized filter.

It is not enough to visualize the messages as they are produced. To make sense of them requires combining visualization with ranking and filtering of the message database. The HEH Messages are stored in the database broken into different fields. The switch system documentation indicates the pieces of the HEH messages and their contents. For example, each HEH message contains information about the time and cell that produced the error, as well as which assembly and sub-assembly and the specific error each produces. For the assemblies reported by the Hardware Error Handler message these assemblies and sub-assemblies correspond to Unit ID, Source and Message. The parsing functions split the incoming HEH message into the separate database fields to make retrieval and analysis possible.

To start the exemplary analysis procedure by ranking and filtering, the user first unchecks all the HEH query filters and sets the Date to the day under investigation, as shown in FIG. 11A. The user then sets the Time range to eliminate the period between 10 PM and 6 AM to focus on the time of day when messages are not caused by technicians performing maintenance.

The report "Rank Cell by Messages" ranks the cells in descending order based on the number of messages each produced. The user presses the 'HEH Query' button (FIG. 11B); and a list of cells appears (FIG. 11C) from this report function. Notice the relative percentage of the cells on the list. This shows that of the 59 cells listed, the top ten cells contribute almost 65% to the list, while the other cells below that all have roughly the same number of messages. This ranking method is a form of Pareto analysis of the error messages.

In the next step, the user takes the cell number at the top of the list, (in this example, cell 105) and puts it into the 'Cell(s)' filter text box (FIG. 11D) and checks the 'Cell(s)' checkbox. Now only messages from cell 105 will be selected from the database. The user then selects the report 'Rank Unit, Call Status, Unit ID'. This ranks HEH messages by the UNIT ID reporting them. When the user again presses the 'HEH Query' button, a list of Unit IDs from cell 105 appears as represented by the sample report shown in FIG. 11E. The sample report shows all of the messages from cell 105 are from the CDM. Note that it is not necessary to know what a CDM is except as a subassembly unit of Cell 105.

The user now takes the Unit ID from the top of the list, (CDM) and selects or types it into the 'Unit ID/Handler' filter text box (FIG. 11F); and the user checks the 'Unit ID/Handler' check box. Now only messages from cell 105 that are from the CDM will be selected from the database. The user then selects the report 'Rank Failure Source' as shown in FIG. 11G, to determine the source of the CDM failure messages.

A sample of the report appears in FIG. 11H. The resulting report shows all the failures are the same type, 'FLEXENT MODULAR CELL ERROR'. As shown in FIG. 11I, the user next sets the HEH Source filter to 'FLEXENT' using the drop down menu or by typing, and then the user selects the report 'Rank Failure Messages' to rank the HEH error messages from the CDM source 'FLEXENT' on cell 105, as shown in FIG. 11J. When the user presses the 'HEH Query' button, a list of HEH error messages appears from the CDM source FLEXENT on cell 105 appears.

A sample of such a list appears in FIG. 11K. In the example, the list indicates that the DS1 is alternating between set and clear. The DS1 is the facility interface card. The facility is the communication line between the cell and the switch. Control information and customer conversations travel over this connection. When this connection is impaired, customer calls may be lost due to garbled communication or loss of cell control.

To check on the current and historical state of the DS1, the user selects or enters 'DS1-1 from the Error Message drop down and checks its box, as shown in FIG. 11L. In the next dialog box (FIG. 11M), the user selects the report 'X-Y Graph' to see the pattern of failures.

The resulting graph shows the messages from cell 105 with time of day across the bottom and Cell number up the Y-axis. A sample of such a graph appears in FIG. 11N. The resulting pattern shows continuous problems with the DS1 on cell 105. This will have to be investigated with switch technicians and possibly the provider of the communication line. In any case, there is a time-stamped record of failure captured by the Real Time Analysis tool. The user may then continue the above process with the next highest-ranked cell, and so on, until the status of all of the HEH problems are driven out.

The process represented by FIGS. 11A to 11N is intended to represent an example only. Those skilled in the art will recognize that such a process may be substantially more automated, using the real-time analyst, discussed above. Also, similar procedures may be developed to help network operations personnel isolate a variety of other network conditions that may lead to call processing failures and other network troubles.

In addition to the use of this tool as a message pattern analyzer, it may also be used in case of a monitoring system failure or Disaster Recovery situation to maintain visibility into the system element functionality. Since it only requires a connection to the system element, it may be used locally to show alarm status and system condition, absent the connection to a remote monitoring and alarming platform. In a disaster situation where national monitoring methods may be unavailable due to network outage, this system provides diagnostic and alarm monitoring services and ensures continuous efficient operation of the network element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of real-time monitoring of operational status of elements of a communications network, wherein the elements are for processing of customers communication traffic through the network, the method comprising steps of:

receiving operational status messages produced by a first one of the communication traffic processing elements for a local log function of the first element, in real-time as the first element generates the messages, via a streaming communication session;

concurrently receiving operational status messages produced by a second one of the elements for processing of customers communication traffic through the network for its local log file in a form intended for network operations personnel, via a streaming communication session as the second element generates the messages in real-time;

parsing each of the messages received from the first communication traffic processing element, to extract relevant operational data;

populating fields of first records in a database with the data extracted by the parsing of the messages received from the first communication traffic processing element;

parsing each of the messages received from the second communication traffic processing element to extract data;

populating fields of second records in the database with the data extracted by the parsing of the messages received from the second communication traffic processing element;

processing at least some first and second records from the database; and providing a display based on results of the processing of first and second records from the database.

2. The method of claim 1, further comprising providing a real-time display of at least some of the received messages as they are received in real-time.

3. The method of claim 1, wherein the step of providing the display comprises:

processing extracted data from fields of at least some records from the database; and providing a real-time display of the processing results.

4. The method of claim 3, wherein the step of providing real-time display of the processing results comprises displaying the processing results as a graph.

5. The method of claim 4, further comprising:

receiving a user input selection of a point on the displayed graph; and presenting one or more records from the database regarding the message or messages that produced the selected point on the displayed graph.

6. The method of claim 1, wherein:

the processing comprises statistical processing of a plurality of the messages of an identified message type; and the providing of the display comprises outputting an alarm indication if results of the statistical processing with regard to the identified message type meet an alarm criteria.

7. The method of claim 6, wherein the statistical processing comprises comparing statistics derived from the received messages to statistics for an earlier period of operations of one or more of the communication traffic processing elements.

8. The method of claim 6, wherein the statistical processing comprises comparing a resulting statistical value to a threshold value.

9. The method of claim 1, wherein at least one of the communication traffic processing elements is an element of a wireless mobile communication network.

10. The method of claim 9, wherein the element of the wireless mobile communication network comprises an element for processing of customer traffic through the network, selected from the group consisting of: a mobile switching center (MSC), a base station (BS), a base station controller (BSC) and a home location register (HLR).

11. A system for real-time monitoring of operational status of elements of a communications network, wherein the elements are for processing of customers communication traffic through the network, the system comprising:

a communication module for establishing streaming communication sessions with a first one of the communication traffic processing elements and with a second one of the communication traffic processing elements, and for receiving a stream of operational status messages produced by each respective one of the first and second communication traffic processing elements for a local log function in a form intended for network operations personnel, as the respective communication traffic processing element generates the messages in real-time, as streaming data, through a respective one of the established streaming communication sessions;

a message database;

a message parser, for processing the messages received from the first and second communication traffic processing elements to extract relevant operational data from each received message for use in populating fields of records in the database;

a processor, for processing at least some of the records in the database populated with data extracted from messages from the first and second communication traffic processing elements; and a display module, for presentation to a user of information based on the results of record processing.

12. The system of claim 11, further comprising:

a buffer for receiving the streaming data containing the messages from the communication module and presenting complete messages to the message parser; and a database insert module, for populating fields of records in the database using the data extracted from the messages by the parser.

13. The system of claim 11, wherein the communication module is configured to establish the streaming communication session with and receive the messages from at least one communication traffic processing element of a wireless mobile communication network.

14. The system of claim 11, further comprising:

a database query interface; and a watch list manager.

15. The system of claim 11, further comprising:

a database query interface; and a result formatter.

16. A program product comprising one or more machine readable storage media and executable code embodied in the storage media, wherein:

execution of the code causes one or more computers to implement a sequence of steps for monitoring of operational status of elements of a communications network, each element is for processing of customers communication traffic through the network, and the sequence of steps comprises:

receiving operational status messages produced by a first one of the communication traffic processing elements for a local log function of the first element, in real-time as the first element generates the messages, via a streaming communication session;

concurrently receiving operational status messages produced by a second one of the elements for processing of customers communication traffic through the network for its local log file in a form intended for network operations personnel, via a streaming communication session as the second element generates the messages in real-time;

parsing each of the messages received from the first communication traffic processing element, to extract relevant operational data;

populating fields of first records in a database with the data extracted by the parsing of the messages received from the first communication traffic processing element;

parsing each of the messages received from the second communication traffic processing element to extract data;

populating fields of second records in the database with the data extracted by the parsing of the messages received from the second communication traffic processing element;

processing at least some first and second records from the database; and providing a display based on results of the processing of first and second records from the database.

* * * * *